July 22, 1969     M. DEAN III, ET AL     3,457,536

SUBMINIATURE PRESSURE TRANSDUCER

Filed April 28, 1967

INVENTORS
MILLS DEAN, III
NORMAN L. FICKEN, Jr.
ERCOLE J. MOSSI

BY    *D. Hodges*

ATTORNEY 3,457,536
SUBMINIATURE PRESSURE TRANSDUCER
Mills Dean III, McLean, Va., and Norman L. Ficken, Jr., Kensington, and Ercole J. Mossi, Beltsville, Md., assignors to the United States of America as represented by the Secretary of the Navy
Filed Apr. 28, 1967, Ser. No. 635,958
Int. Cl. G01l 1/22
U.S. Cl. 338—4                         2 Claims

ABSTRACT OF THE DISCLOSURE

A subminiature pressure transducer having a diaphragm sensing surface with sensors to measure stresses in the diaphragm induced by the test pressure. The diaphragm is biased by a reference pressure, applied to a side opposite the test pressure, to prevent stress reversal in the diaphragm structure.

---

The invention described herein may be manufactured and used by or for the Government of the United States of America for governmental purposes without the payment of any royalties thereon or therefor.

The present invention relates to a subminiature pressure transducer and more particularly to a subminiature transducer capable of withstanding rapid, extreme pressure variations.

Heretofore subminiature pressure transducers, using a diaphragm sensing surface, have been unable to withstand application under test conditions in which there are rapid fluctuations of pressure extremes. The cause of failure of these gages under rapid pressure variations is the "oil canning" of the sensing surface. This reversal of stress in the diaphragm not only causes erroneous and non-linear measurements but in many cases causes the sensing elements attached to the diaphragm surface to fracture internally in the case of wire strain gages or break loose from the diaphragm entirely thus preventing their further use.

Typical of the test environment causing sensor failure is that encountered in cavitation tests conducted on hydrofoil or propeller surface. During collapse of a cavity on such a surface the rate of pressure change may be as high as 150 p.s.i. per millisecond.

The present invention provides a transducer having a hollow generally cylindrical body member with a flexible diaphragm sealing one end and a header assembly sealing the other end. The sensing elements, such as wire strain gages or piezoresistive devices are attached to the interior surface of the diaphragm to measure stress in the diaphragm caused by external pressure changes. The body of the cylinder is sealed at a pressure beyond the range of pressures to be measured. This feature provides a mechanical bias on the diaphragm and prevents stress reversal of the diaphragm surface and the resulting problems previously described.

An object of this invention is to provide a pressure transducer capable of operation under extreme pressure variations.

Another object of this invention is to provide a pressure transducer having one side of its sensing surface in a sealed environment.

A further object of this invention is to provide a miniature diaphragm-type pressure transducer capable of providing an accurate electrical signal under heavy shock loading.

A still further object of this invention is to provide improved means for attaching stress sensing elements to a flexible surface.

Figure 2:
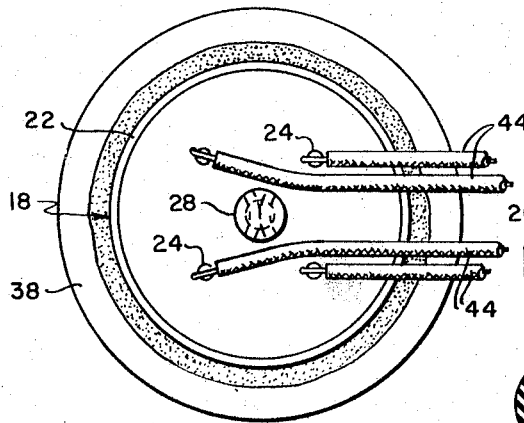
Figure 3:
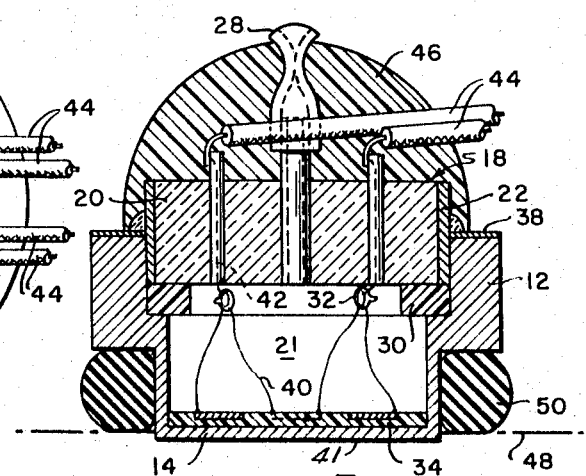
Figure 1:
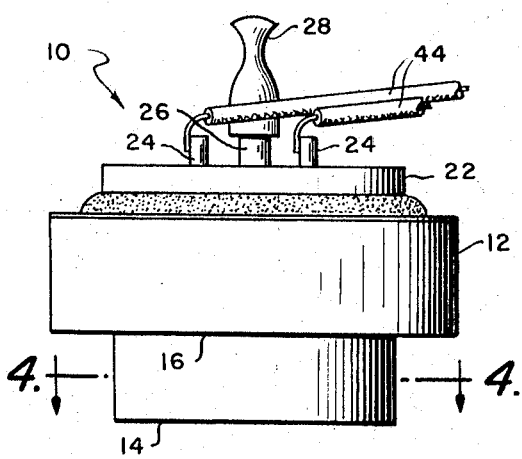
Figure 4:
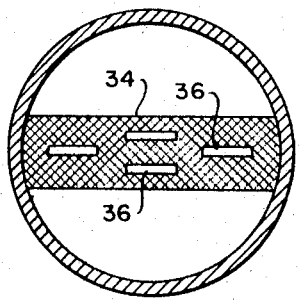
Figure 5:
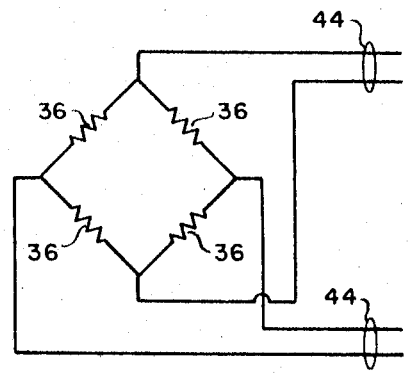
Figure 6:

Other objects and many of the attendant advantages of this invention will be readily appreciated as the same becomes better understood by reference to the following detailed description when considered in connection with the accompanying drawings wherein:

FIG. 1 is an elevation view of a subminiature pressure transducer;
FIG. 2 is a plan view of FIG 1;
FIG. 3 is a sectional view of FIG. 1 and showing in addition encapsulation of the electrical terminals;
FIG. 4 is a sectional view of FIG. 1 along line 4—4;
FIG. 5 is a schematic diagram showing the manner of connection of the sensing elements; and
FIG. 6 is an elevation view of the transducer of FIG. 1 shown in its actual size.

Referring now to the drawings wherein like numerals indicate like parts through the several views, there is shown in FIGS. 1, 2 and 3 the subminiature pressure transducer 10 which includes a housing 12 of an impervious material, such as stainless steel or other material treated to eliminate porosity, having a thin diaphragm 14 at one end thereof and shoulder 16 to facilitate mounting. The open end of housing 12 is closed by a glass-to-metal seal 18 which consists of a glass header 20 fused to a metal ring 22 which has been treated for solderability. The housing 12 and seal 18 forming a chamber 21. There are included in the header 20, 4 terminal pins, indicated at 24 and an exhaust tube 26 to which is attached a pinch-off section 28. Between the seal 18 and the housing 12 there is a terminal ring 30 having 4 connector rings 32 thereon.

On the inside surface of diaphragm 14 there is placed a strip of epoxy resin 34 upon which are attached 4 strain sensing elements 36.

The transducer is assembled by first preparing the housing 12 by applying a thin silver plating 38 to the rim of the housing 12 to facilitate soldering, and a thin gold plate 41 to the exterior surface of diaphragm 14 to prevent corrosion. The interior surface of diaphragm 14 is then subjected to air blasting with a fine (20 micron) grit or etched to provide a slightly roughened, clean surface for epoxy-bonding. A strip of epoxy 34 is then applied to the surface as shown in FIG. 4. Using the same type of epoxy the gages 36 are then bonded to the strip 34. The epoxy resin is of a type which will retain a measure of compliance after curing such as unfilled Hysol 0151 manufactured by Hysol Corp., Olean, N.Y. The epoxy serves the dual purposes of providing electrical insulation between the sensors 36 and the housing 12 and as a means for attachment of the sensors. The ring 30 is next inserted in the housing as shown in FIG. 3 and fine flexible lead wires 40 are connected between the sensors 36 and the terminal rings 32. The sensors being connected in a conventional bridge circuit as shown in FIG. 5. Lead wires 42 are then connected to pins 24 in the seal 18 and the seal placed in the top of housing 12. The ring 22 is then soldered to the housing 12 as shown in FIG. 3. Lead wires 44 are attached to the exterior of pins 24 and normal continuity checks made. Pinch off section 28 is soldered to exhaust tube 26 and the pressure in chamber 21 is set at a predetermined level according to the anticipated test environment by conventional means not shown. The pinch-off section 28 is tinned on its interior surface with soft solder prior to installation on exhaust tube 26 and when the required internal pressure is achieved it is pinched off using heated pliers thus providing a hermetic seal for chamber 21. Monitoring of the sensor resistance after sealing provides an indication of the adequacy of the seal by indicating pressure changes due to leakage.

After leak checking the external electrical connections are waterproofed by encapsulating the upper portions of the transducer with an epoxy resin 46 such as Ciba 5002, manufactured by Ciba Product Co., Fair Lawn, N.J.

This actual size of the transducer is illustrated by FIG.

6. The diameter of the diaphagm surface being approximately ¼″ and the overall height being approximately 11/32″.

In use, the transducer is mounted with the diaphragm 14 flush with the test surface. In order to isolate the transducer housing 12, from stresses induced by distortion of the test surface, the transducer is mounted with an elastomeric ring 50 as shown in FIG. 3.

The advantages of the gage herein described over presently available gages of similar size and sensitivity were demonstrated in a series of comparative water tunnel tests.

The gages tested were both of subminiature size having a range of 50 p.s.i. The inside surface of the diaphragm of the prior art gages was at atmospheric pressure while the interior of the new gage was evacuated to $10^{-4}$ torr. The test environment was adjusted to establish cavity closure conditions on the gage sensing surfaces. The new gage remained intact after 10½ hours of testing at water speeds up to 65 ft./sec. and pressure changes in excess of 120 p.s.i./sec. while the prior art gage failed at a water speed of 30 ft./sec.

Thus it is apparent that the invention disclosed herein provides a subminiature diaphragm-type pressure transducer which will insure accurate pressure measurement under extreme environmental conditions shown to cause destruction of presently available gages of comparable size, sensitivity and accuracy.

Obviously many modifications and variations of the present invention are possible in the light of the above teachings. For example, the housing need not be made of a single piece but the diaphragm and body may be of separate pieces hermetically sealed in assembly. In addition the gage may be used to measure differential pressure rather than absolute pressure by applying any reference pressure to the inside surface of the diaphragm rather than a vacuum through the exhaust tube.

It is, therefore, to be understood that within the scope of the appended claims the invention may be practiced otherwise than as specifically described.

What is claimed is:
1. A flush-mounted subminiature pressure transducer for measuring fluid pressure acting on the surface of a wall, said transducer comprising:
   a housing of unitary structure in the form of a hollow cylinder closed at one end and open at the other end, said closed end forming, as a part of said housing, a thin flexible diaphragm and said open end having an internal shoulder formed therein and an external mounting shoulder surrounding the open end for mounting said transducer flush with the surface upon which pressure is to be measured;
   a header attached in sealing engagement in the open end of said housing against the internal shoulder and forming a cavity within said housing;
   a sealable tube member extending through said header and communicating between said cavity and ambient fluid outside the housing for establishing and maintaining pressure in said cavity at a preselected level;
   a plurality of strain gages attached to the internal surface of said diaphragm;
   a plurality of electrical terminal pins extending through said header; and
   means for electrically connecting said strain gages to said terminal pins.

2. A flush mounted subminiature pressure transducer as defined in claim 1 and further comprising an elastomeric ring peripherally engaging said housing at the closed end thereof in sealing engagement with said external shoulder and the inner surface of the wall upon which pressure is to be measured, said elastomeric ring being of a thickness such that the external surface of the closed end of said housing is flush with the external surface of said wall when the transducer is mounted on said surface.

References Cited
UNITED STATES PATENTS

| | | | |
|---|---|---|---|
| 2,400,467 | 5/1946 | Ruge | 338—4 |
| 2,507,501 | 5/1950 | Clark | 338—4 |
| 2,629,801 | 2/1953 | Warshaw | 338—4 |
| 3,389,362 | 6/1968 | McLellan | 338—4 |

OTHER REFERENCES

The Strain Gage Primer, by C. C. Perry et al., 2nd ed., McGraw-Hill Book Co. New York, pp. 34–35, 41, 42.

REUBEN EPSTEIN, Primary Examiner